April 26, 1932.   H. BARTH   1,856,018
ELECTRICAL CONNECTER AND TERMINAL
Filed April 11, 1930
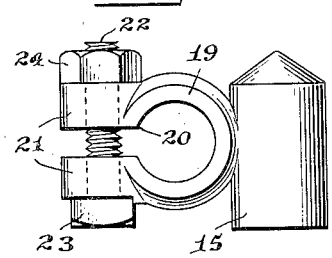
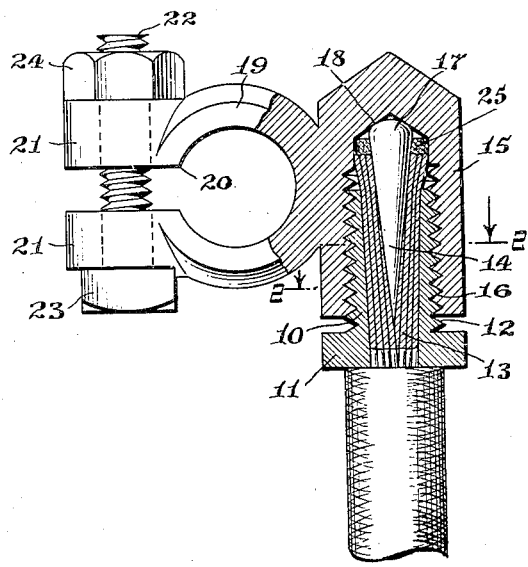
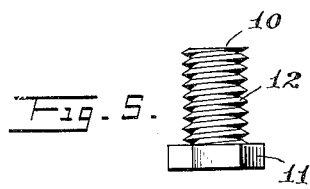
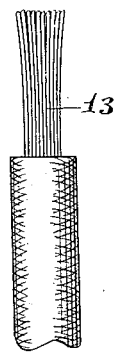
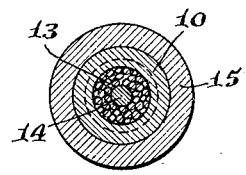
INVENTOR
Herrman Barth
BY Munn & Co
ATTORNEYS
WITNESSES Patented Apr. 26, 1932

1,856,018

UNITED STATES PATENT OFFICE

HERRMAN BARTH, OF NEW YORK, N. Y.

ELECTRICAL CONNECTER AND TERMINAL

Application filed April 11, 1930. Serial No. 443,512.

My invention has for its object to provide an electrical connecter and terminal having improved means for spreading members of a metallic conductor against a terminal member in which the metallic conductor is disposed.

Another object of the invention is to provide a wedge disposed between members of a metallic conductor at the end of a cable for forcing the members of the metallic conductor against a sleeve which has threads meshing in inner threads in a cap terminal, the cap terminal being engaged by the outer end of the wedge so that the sleeve when turned home in the cap terminal will force the outer end of the wedge against the cap terminal to bind the parts together and to further spread the members of the metallic conductor for engagement with the sleeve.

Additional objects of the invention will appear in the following specification in which the preferred form of my invention is described.

In the drawings similar reference characters refer to similar parts in all the views in which Figure 1 is a sectional view illustrating the construction of my invention, Fig. 2 is a sectional view on the line 3—3, Fig. 1, Fig. 3 is a view illustrating the cap terminal and the related parts, Fig. 4 is a view illustrating the wedge, Fig. 5 is a view illustrating the sleeve, and Fig. 6 is a view illustrating the cable with the members of the metallic conductor extending therefrom.

By referring to the drawings it will be seen that the sleeve 10 has an angular head 11 and an outer thread 12, the members 13 of the metallic conductor being disposed in the sleeve 10, as best illustrated in Fig. 1 of the drawings, after which a wedge 14 is disposed at substantially the center of the outer ends of the members 13 of the metallic conductor and is driven home between the said members to force the said members against the inner sides of the sleeve 10.

When the members 13 of the metallic conductor, which are disposed in the sleeve 10, have been forced by means of the wedge 14 against the inner side of the sleeve 10, the sleeve with the ends of the members 13 of the metallic conductor and the wedge is disposed in position relatively to the cap terminal 15 and the outer thread 12 is brought in position to mesh with the inner thread 16 in the cap terminal 15, when the sleeve 10 is turned home in the cap terminal 15 to force the outer rounded head 17 of the wedge 14 against the surface 18 at the inner end of the opening of the cap terminal, so that with the continued rotation of the sleeve 10 relatively to the cap terminal 15 the wedge 14, because of the engagement of its rounded end 17 with the cap terminal, will serve to force the wedge 14 further home between the members 13 of the metallic conductor and will serve to hold the said members in this position so that considerable contact will be made between the said members 13 and the cap terminal 15.

Preferably the cap terminal 15 has a collar 19 with a slot 20 therein, the collar 19 at each side of the said slot 20 having a lug 21 with apertures 22 through which a bolt 23 extends, the bolt being engaged by a nut 24, by which means the collar 19 may be secured against a battery post, or other conductor.

As will be seen by referring to Fig. 4 of the drawings, the wedge 14 is cone-shaped and has its outer end rounded, as shown at 17.

A washer 25 is preferably disposed on the wedge 14 adjacent its outer rounded end 17. This washer 25 is preferably made of felt or similar material and it is soaked in oil or grease prior to use so that the oil or grease will serve to prevent the members 13 of the metallic conductor from corroding.

What is claimed is:

1. In an electrical connecter and terminal, a sleeve having an outer thread for receiving members of a metallic conductor, a wedge to be driven between the said members for forcing the members against the inner sides of the sleeve, and a cap terminal free from the wedge for rotating relatively thereto and having an inner thread in which the outer thread on the sleeve is adapted to mesh, permitting the sleeve to be turned home in the cap terminal to force the outer end of the wedge against the cap terminal to drive the wedge relatively to the said members to hold the said members relatively thereto.

2. In an electrical connecter and terminal, a sleeve having an outer thread for receiving members of a metallic conductor, a wedge to be driven between the said members for forcing the members against the inner sides of the sleeve, the outer end of the wedge having a rounded bearing surface, and a cap terminal free from the wedge for rotating relatively thereto and having an inner thread in which the outer thread on the sleeve is adapted to mesh, permitting the sleeve to be turned home in the cap terminal to force the said outer rounded end of the wedge against the cap terminal to drive the wedge relatively to the said members and to hold the said members relatively thereto.

3. In an electric connecter and terminal, a sleeve having an outer thread, members of a metallic conductor disposed in the sleeve, a cone-shaped wedge driven between the said members at their outer ends for forcing the said members against the inner sides of the sleeve, the wedge having an outer rounded bearing surface, and a cap terminal free from the wedge for rotating relatively thereto and having an inner thread in which the outer thread meshes, the sleeve being turned home relatively to the cap terminal to drive the wedge further in the said members by the engagement of its outer rounded bearing surface with the inner surface of the cap terminal.

4. In an electrical connecter and terminal, a sleeve for receiving members of a metallic conductor, a wedge disposed between the said members, an oil carrying element mounted on the wedge beyond the said members, and a cap terminal enclosing the element, the wedge and a portion of the sleeve.

5. In an electrical connecter and terminal, a sleeve having an outer thread for receiving members of a metallic conductor, a wedge to be driven between the said members for forcing the members against the inner sides of the sleeve, a cap terminal free from the wedge for rotating relatively thereto and having an inner thread in which the outer thread on the sleeve is adapted to mesh, permitting the sleeve to be turned home in the cap terminal to force the outer end of the wedge against the cap terminal to drive the wedge relatively to the said members to hold the said members relatively thereto, and an oil carrying element mounted on the wedge.

6. In an electrical connecter and terminal, a sleeve for receiving members of a metallic conductor, a wedge disposed between the said members, an oil carrying element mounted on the wedge, and a cap terminal enclosing the element, the wedge and a portion of the sleeve.

Signed at New York city in the county of New York and State of New York this 10th day of April, 1930, A. D.

HERRMAN BARTH.